United States Patent
Genereux et al.

(10) Patent No.: US 9,308,538 B2
(45) Date of Patent: Apr. 12, 2016

(54) PORTABLE AIR CLEANER WITH IMPROVED MULTI-STAGE ELECTROSTATIC PRECIPITATOR

(71) Applicant: Lasko Holdings, Inc., Wilmington, DE (US)

(72) Inventors: Philippe J Genereux, Ottawa (CA); Rudy A Vandenbelt, Ottawa (CA)

(73) Assignee: Lasko Holdings, Inc., Wilmington, DE (US)

( * ) Notice: Subject to any disclaimer, the term of this patent is extended or adjusted under 35 U.S.C. 154(b) by 425 days.

(21) Appl. No.: 13/782,982

(22) Filed: Mar. 1, 2013

(65) Prior Publication Data

US 2013/0233172 A1    Sep. 12, 2013

Related U.S. Application Data

(60) Provisional application No. 61/608,260, filed on Mar. 8, 2012, provisional application No. 61/608,274, filed on Mar. 8, 2012.

(51) Int. Cl.
| | |
|---|---|
| *B03C 3/45* | (2006.01) |
| *B03C 3/12* | (2006.01) |
| *B03C 3/32* | (2006.01) |
| *B03C 3/36* | (2006.01) |
| *B03C 3/47* | (2006.01) |

(52) U.S. Cl.
CPC ... *B03C 3/45* (2013.01); *B03C 3/12* (2013.01); *B03C 3/32* (2013.01); *B03C 3/368* (2013.01); *B03C 3/47* (2013.01); *B03C 2201/04* (2013.01)

(58) Field of Classification Search
CPC ........ B03C 2201/04; B03C 3/12; B03C 3/32; B03C 3/368; B03C 3/45; B03C 3/47
See application file for complete search history.

(56) References Cited

U.S. PATENT DOCUMENTS

| | | |
|---|---|---|
| 3,616,608 A | 11/1971 | Steuernagel et al. |
| 4,284,420 A | 8/1981 | Borysiak |
| 4,303,418 A | 12/1981 | Coe, Jr. |
| 4,713,092 A | 12/1987 | Kikuchi et al. |
| 6,007,781 A | 12/1999 | Campbell et al. |
| 6,790,259 B2 | 9/2004 | Rittri et al. |
| 7,857,890 B2 | 12/2010 | Paterson et al. |
| 8,043,573 B2 | 10/2011 | Parker et al. |
| 2008/0314250 A1* | 12/2008 | Cowie et al. ............... 96/86 |
| 2010/0155025 A1* | 6/2010 | Jewell-Larsen et al. ...... 165/96 |

* cited by examiner

*Primary Examiner* — Christopher P Jones
(74) *Attorney, Agent, or Firm* — Pepper Hamilton LLP

(57) ABSTRACT

An electrostatic precipitation air cleaner to reduce ozone output is provided. The electrostatic precipitation air cleaner includes a housing with an air inlet and outlet. Located in the housing are an air mover for moving a stream of air along an airflow path between the inlet and the outlet, an ion emitter electrode positioned in the airflow path downstream of the inlet for ionizing particulates entrained in the stream of air, a collector electrode having an inlet downstream of the ion emitter electrode, and an intermediate element intermediate the ion emitter electrode and the collector electrode. The collector electrode is comprised of a plurality of collector plates spaced apart in a direction transverse to the airflow path. The plates are electrically biased to create and maintain an electric field in the space therebetween to precipitate ionized particulates entrained in the stream of air onto a confronting surfaces of the plates.

22 Claims, 9 Drawing Sheets

PORTABLE AIR CLEANER WITH IMPROVED MULTI-STAGE ELECTROSTATIC PRECIPITATOR

RELATED APPLICATION DATA

This application claims priority to U.S. provisional application Ser. No. 61/608,260 filed Mar. 8, 2012 and U.S. provisional application Ser. No. 61/608,274 filed Mar. 8, 2012, both of which are incorporated herein by reference in their entirety.

TECHNOLOGY FIELD

The invention is directed to the field of gas purification, and more particularly, to portable electrostatic precipitation room air cleaners utilizing multiple stage electrostatic precipitation air filtration.

BACKGROUND

Electrostatic precipitation room air cleaners are very effective at removing particulates from the air and particularly excel when it comes to removing small particles. The filters are cost-effective, as the user does not have to purchase replacement filters on a regular basis, and they may be reused after washing.

One drawback to conventional electrostatic precipitation room air cleaners is that they typically produce ozone. Ozone can also be present as a naturally occurring component of room air. Regulatory bodies have enacted legislation to regulate the production of ozone so that its deleterious effects may be mitigated.

The electrostatic precipitation filtration systems of conventional electrostatic precipitation room air cleaners typically have consisted of an ion emitter and a collector electrode stage cooperative to provide ions and to precipitate ionized particulates out of the air stream. The conventional emitter electrode stage may include an ion source such as, for example, a wire ion emitters. The conventional collector electrode stage typically comprise a plurality of electrically biased flat or uni-planar collector plates.

The ozone produced by such conventional electrostatic precipitation room air cleaners results from the high ionization potential of the ion emitters and from "arcing" between the collector plates that occurs during the accumulation of ionized particulate precipitation onto their collector plates. The level of ozone produced by conventional electrostatic precipitation room air cleaners has typically been controlled to conform to regulated levels by an ozone remediation element. The conventional ozone remediation element is operable to convert controlled amounts of ozone into oxygen just prior to the air exiting the housings of such conventional electrostatic precipitation room air cleaners.

The two stage electrostatic precipitation systems of conventional electrostatic precipitation air cleaners have typically required multiple ion wires emitters and cooperative ion stripper plates in order to provide a clean air delivery rate (CADR) sufficient to clean a room of ordinary size. Not only does the cost increase according to the number of wires employed, but the quantity of ozone also increases. Since the multiple wire ion emitters are each subject to their own corona discharge, the quantity of ozone increases according to the number of wires employed.

Another problem with the two stage electrostatic precipitation systems of conventional electrostatic precipitation air cleaners is the arcing that may occur between the electrically biased collector plates. Arcing between the collector plates may occur because large particles of dust or other debris have bridged the space between two of the biased collector plates. Conventional electrostatic precipitation air cleaners have responded by placing additional filters prior to the ion emitter to prevent such large debris from entering the electrostatic precipitation system. The addition of this filter increases the cost of the device.

Yet another reason arcing may occur is when one of the flat or uni-planar biased collector plates is distorted, so as to reduce the space between itself and the adjacent biased collector plates. When this space is reduced sufficiently, an electrical arc can occur between the plates. Conventional electrostatic precipitation air cleaners have responded by adding additional structures between the flat or uni-planar biased collector plates, such as, for example, spacers. Not only do such spacers increase the cost of the device, they also inhibit air flow. These spacers also have been found to collect debris, and debris accumulation may be sufficient to bridge the space between the flat or uni-planar biased collector plates and cause electrical arcing to occur.

SUMMARY

In view of the deficiencies of conventional electrostatic precipitation air cleaners, what is needed is an improved electrostatic precipitation air cleaner that reduces and/or eliminates ozone which results from the electrostatic precipitation process and mitigates the arcing problem associated with the biased collector plates.

It is also desirable that the improved electrostatic precipitation air cleaner reduces materials and manufacturing costs while providing a clean air delivery rate sufficient to clean an ordinary sized room. In short, the improved electrostatic precipitation air cleaner should overcome the deficiencies of conventional technology while preserving and/or enhancing the functionality and performance of the system.

Accordingly, the present invention discloses an improved performance electrostatic precipitation room air cleaner having multi-stage electrostatic precipitation filter systems that reduce and/or eliminate ozone which results from the electrostatic precipitation process. The improved performance electrostatic precipitation room air cleaners may also reduce and/or eliminate ozone which is naturally present in room air.

A related object is to disclose a multi-stage electrostatic precipitation filter system providing improved performance electrostatic precipitation room air cleaners whose component stages may be removed for cleaning and may be dishwasher safe.

A further related object of the present invention is to disclose a multi-stage electrostatic precipitation filter system providing improved performance electrostatic precipitation room air cleaners in which arcing between biased collector plates is reduced or eliminated.

Yet another object of the present invention is to disclose an electrostatic precipitation filter that improves performance due to flow redirection causing improved particle capture.

Yet another object is to disclose an improved electrostatic precipitation air cleaner that reduces cost of assembly/manufacture as material usage and labor time are reduced.

BRIEF DESCRIPTION OF THE DRAWINGS

The invention is best understood from the following detailed description when read in connection with the accompanying drawing. It is emphasized that, according to common practice, the various features of the drawing are not to scale.

On the contrary, the dimensions of the various features are arbitrarily expanded or reduced for clarity. Included in the drawing are the following Figures.

DETAILED DESCRIPTION OF ILLUSTRATIVE EMBODIMENTS

Figure 1:
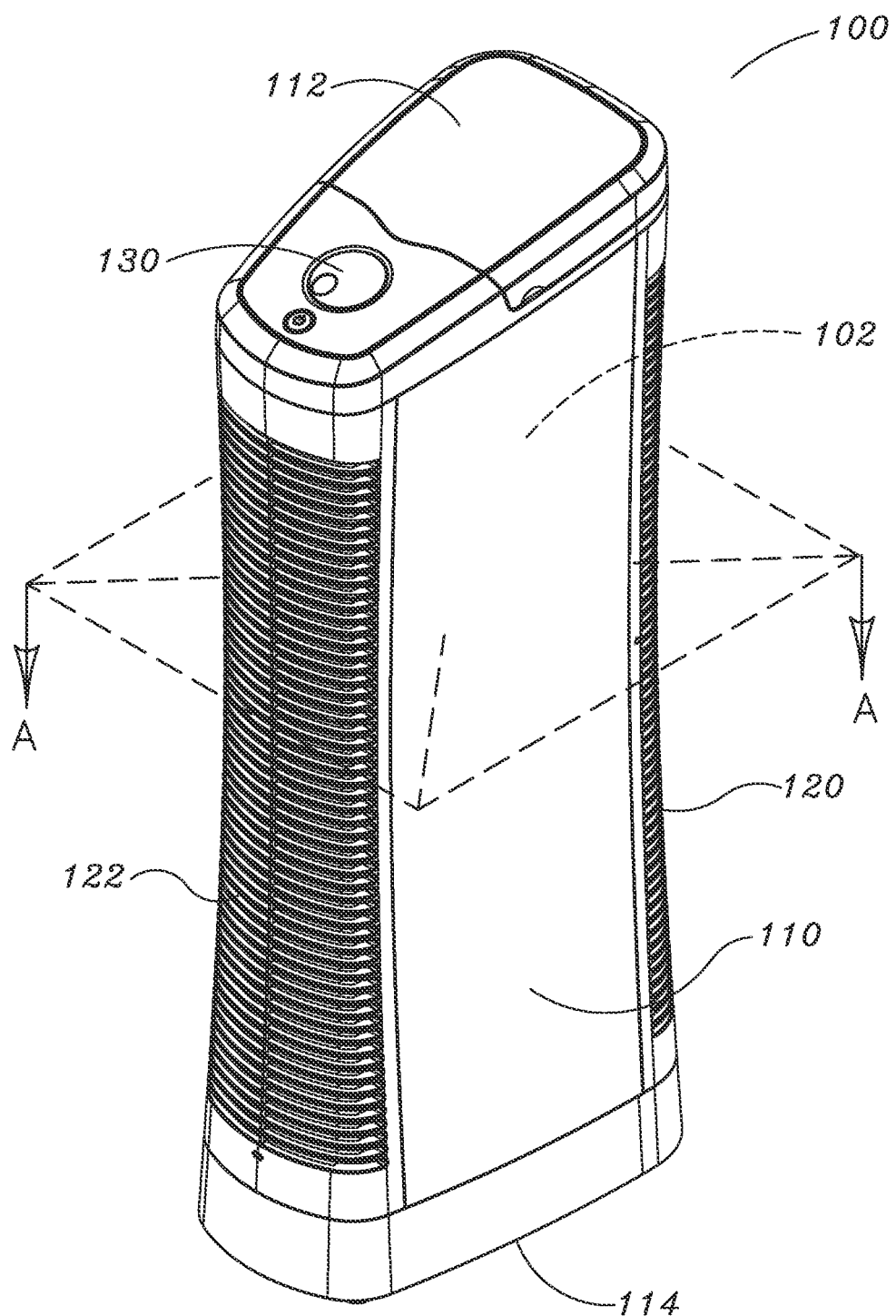
FIG. 1 is a front perspective view of an exemplary embodiment of an improved electrostatic precipitation air cleaner.

FIG. 1 is a front perspective view of an exemplary embodiment of improved electrostatic precipitation air cleaner 100. Air cleaner 100 includes housing 110 having air intake 120 and air exit 122. Housing 110 defines internal space 102. Also shown is base 114 that provides an interface between air cleaner 100 and a mounting surface, such as, for example, a floor or table. Control 130 and filter access door 112 are located on a top portion of housing 110 to provide easy access for the user.

Figure 2:
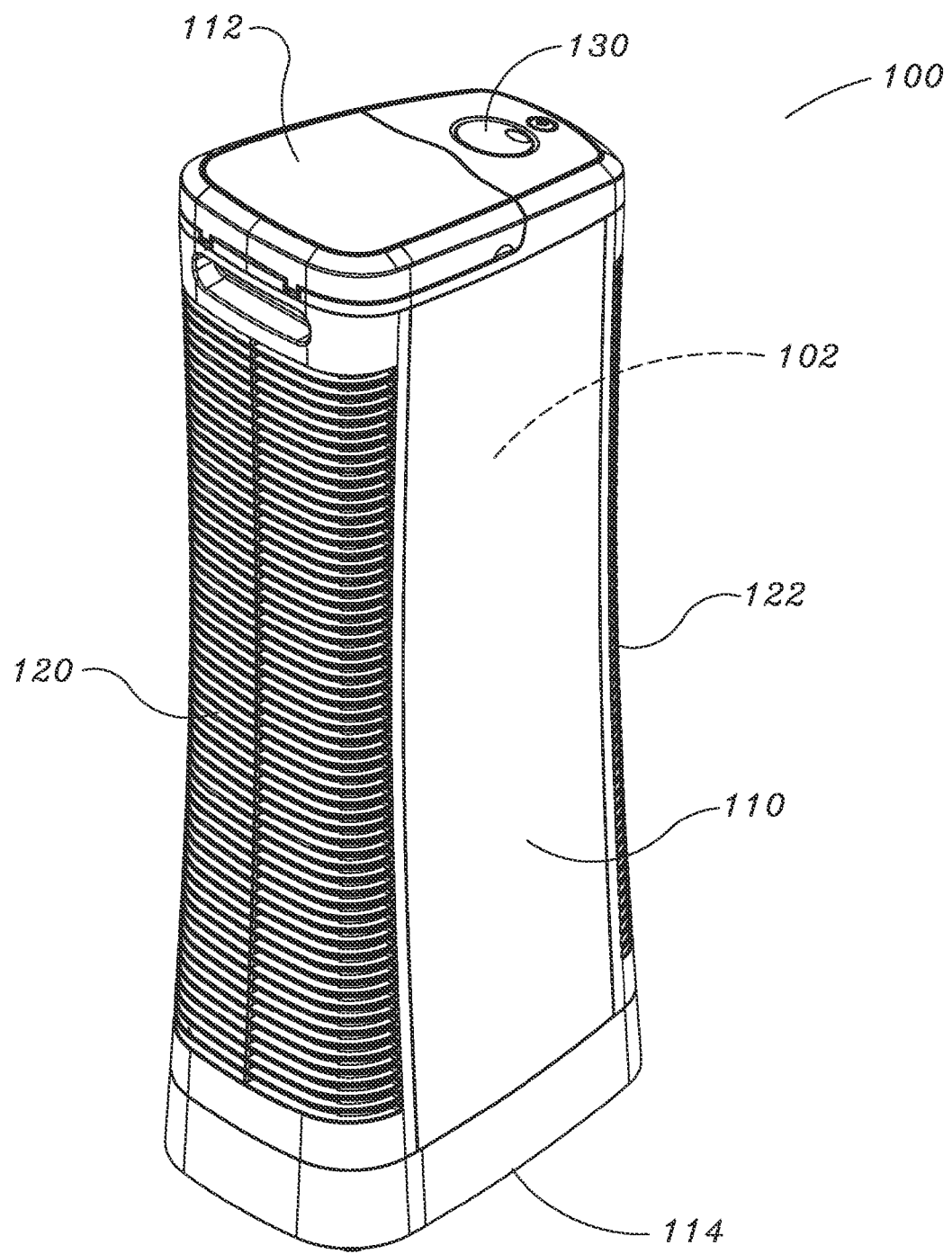
FIG. 2 is a rear perspective view of the exemplary embodiment of FIG. 1.

FIG. 2 is a rear perspective view of the exemplary embodiment of improved electrostatic precipitation air cleaner 100 of FIG. 1.

Figure 3:
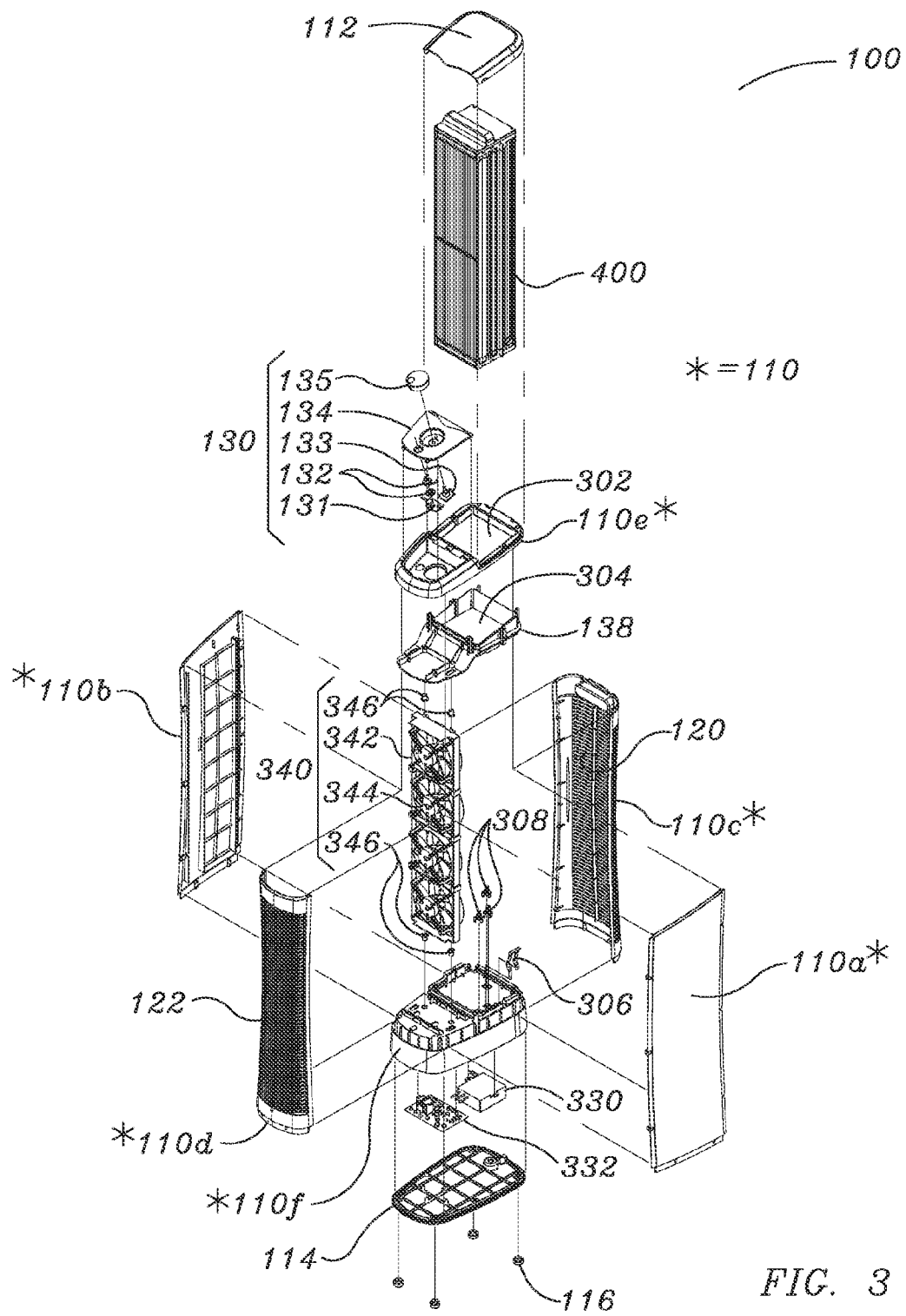
FIG. 3 is a front perspective exploded view of the exemplary embodiment of FIG. 1.

FIG. 3 is a front perspective exploded view of improved electrostatic precipitation air cleaner 100 of FIG. 1. Housing 110 is comprised of right panel 110a, left panel 110b, rear panel 110c, front panel 110d, housing top 110e, and housing bottom 110f. Air intake 120 and air exit 122 are located in rear panel 110c and front panel 110d, respectively.

Control 130 is mounted to housing top 110e. As shown, control 130 includes tactile switch 131, operator interface 132, rotary switch 133, switch panel 134, and knob 135. Internal frame 138 is attached to housing top 110e.

Base 114 is mounted to housing bottom 110f, creating a mounting cavity for power supply 330 and PCB/voltage source 332. Feet 116 are attached to base 114 and provide improved electrostatic precipitation air cleaner 100 stability when located on a flat mounting surface.

Housing 110 when assembled defines internal space 102 as shown in FIGS. 1 and 2. As shown, air mover 340 and filter cell 400 are located within internal space 102 defined by housing 110.

Air mover 340 includes multiple air generators 344 mounted to array plate 342. Array plate 342 is attached to housing 110 through vibration mounts 346. When in operation, control 130 may control and regulate the air volume produced by air mover 340 by regulating the speed and/or the number of air generators 344 in operation.

Filter cell 400 is installed in housing 110 through access ports 302 and 304 of housing top 110e and internal frame 138 respectively. Filter access door 112 covers access ports 302 and 304 after filter cell 400 is installed into housing 110 of improved electrostatic precipitation air cleaner 100. Electrical contact of filter cell 400 is achieved via spring contacts 308. De-gauss strip 306 contacts filter cell 400 during removal of filter cell 400 from housing 110 and dissipates any electrical charge that may reside in filter cell 400.

Improved electrostatic precipitation air cleaner 100 may be assembled utilizing conventional techniques, such as for example; screws, adhesives, snap fits, press fits, Velcro, sonic welding and the like without departing from the spirit of the invention.

Figure 4:
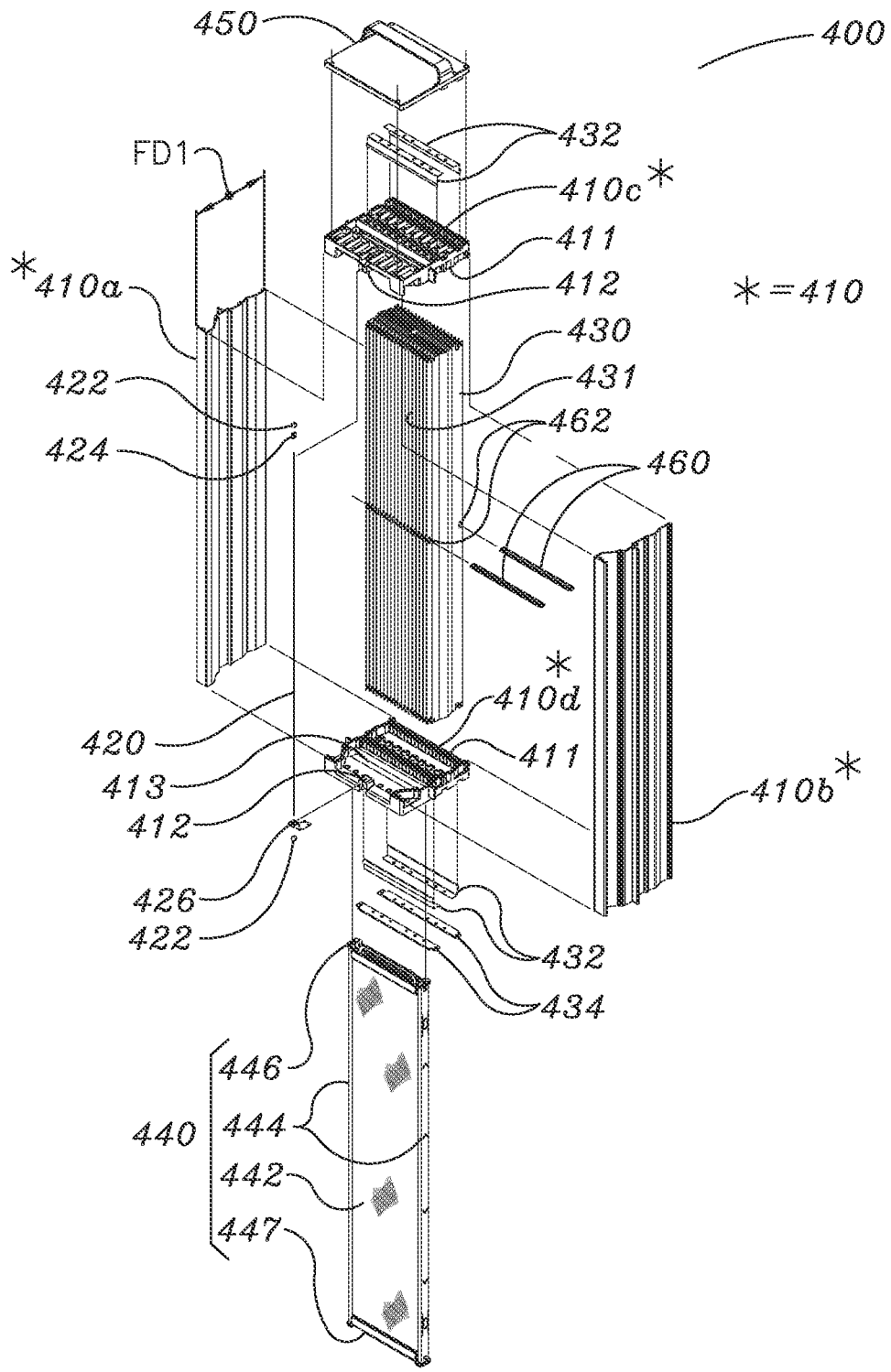
FIG. 4 is a rear exploded perspective view of a multi-stage electrostatic precipitation filter cell.

FIG. 4 is a rear exploded perspective view of a multi-stage electrostatic precipitation filter cell 400. Filter cell 400 includes filter frame 410 which includes right frame side 410a, left frame side 410b, frame top 410c, and frame bottom 410d. As shown, when assembled, ion emitter electrode 420, intermediate element 440, and collector electrode 430 are located within filter frame 410.

In the embodiment shown in FIG. 4, ion emitter electrode 420 is a wire extending between frame top 410c and frame bottom 410d. Ion emitter electrode 420 is attached through slot/socket 412 located in top and bottom frames 410c and 410d and retained in slot/socket 412 via anchor 422 crimped onto each distal end of ion emitter electrode 420. Spring 424 is used to maintain a straightness of ion emitter electrode 420 when assembled between top and bottom frames 410c and 410d by exerting light tension. Wire contact 426 contacts anchor 422 and ion emitter electrode 420 and makes electrical contact when filter cell 400 is installed in improved electrostatic precipitation air cleaner 100. As described, ion emitter electrode 420 can easily be replaced in filter cell 400 in case of damage.

Figure 5:
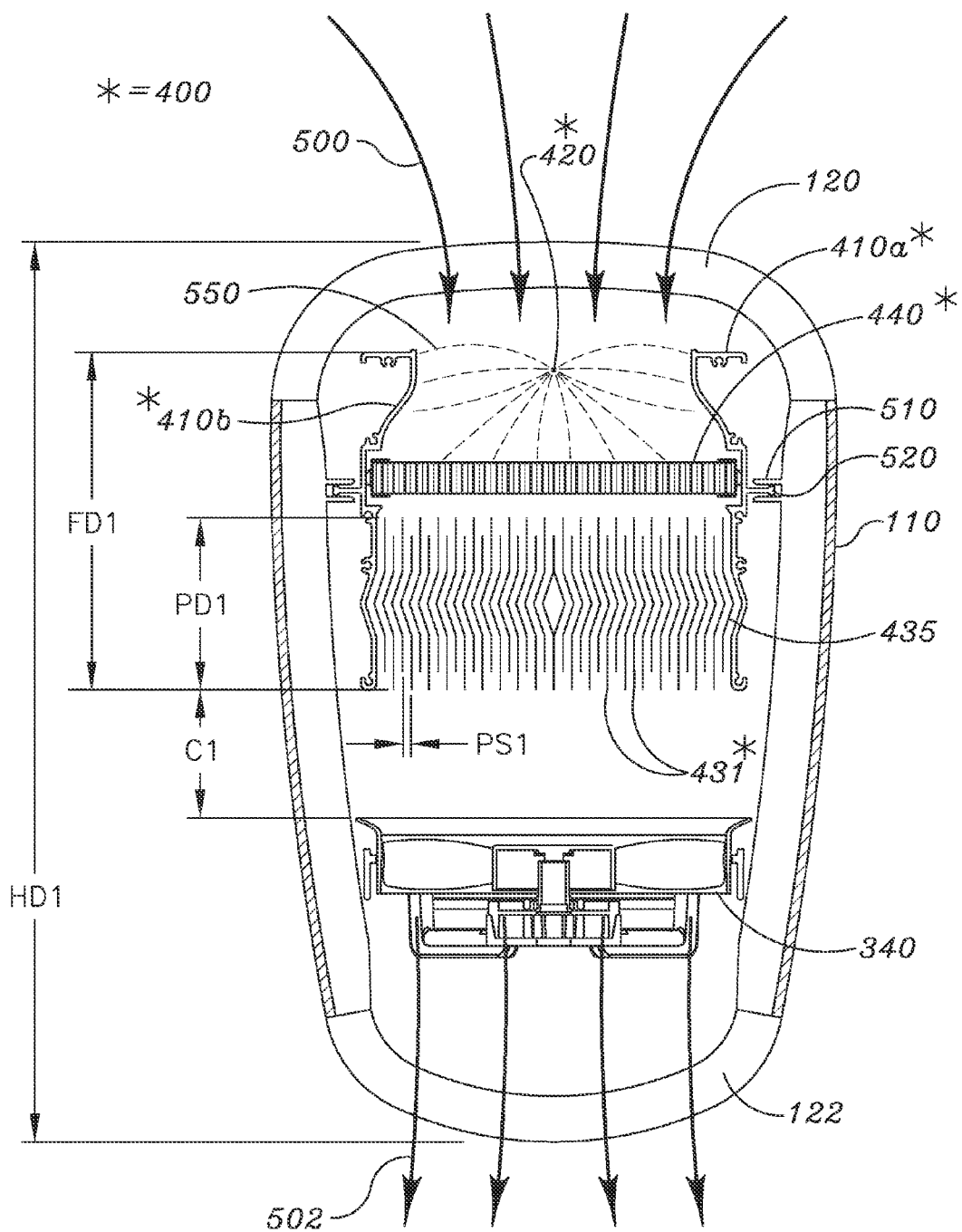
FIG. 5 is a horizontal cross section view AA of FIG. 1.

As shown in FIGS. 4 and 5, collector electrode 430 is comprised of a plurality of collector plates 431 that extend between top and bottom frames 410c and 410d. As shown in FIG. 5, collector plates 431 are not uni-planar having non parallel surfaces relative to each other, which facilitate the flatness and structural integrity. As shown in FIG. 4, each of the collector plates 431 may include spacer holes 462 to facilitate the installation of spacers 460. Spacers 460 may be used to maintain the desired space between each of the collector plates 431, especially as the vertical length of filter cell 400 increases.

Each of the collector plates 431 fit into plate slots 411 of top and bottom frames 410c and 410d. Collector plates 431, L-contacts 432, and plate contacts 434 are designed to electrically connect the collector electrode 430 when filter cell 400 is assembled and installed in improved electrostatic precipitation air cleaner 100.

Intermediate element 440 is comprised of air permeable mesh 442, sides 444, top 446, and bottom 447. Air permeable mesh 442 may be composed of a non-conductive material, such as, for example, polymer, paper, glass fibers, and the like. It is also contemplated that air permeable mesh 442 may be composed of an electrical conductive material, such as, for example, steel, aluminum, copper or other metals or metal alloys. Additionally, air permeable mesh 442 may be coated with carbon, manganese oxide, charcoal, titanium dioxide, and/or other materials for the purpose of facilitating odor and chemical removal from an air stream passing through air permeable mesh 442.

Intermediate element 440 is assembled into filter cell 400 through element slots 413 located in top and bottom frames 410c and 410d. As shown, intermediate element 440 can be removed from filter cell 400 through element slot 413 located in bottom frame 410d. When assembled, cell top 450 covers element slot 413 located in top frame 410c and, as such, prevents the removal of intermediate element 440 through top frame 410c. The ability to remove intermediate element 440 from filter cell 400 allows the user to periodically clean and/or replace intermediate element 440 absent the need of disassembling filter cell 400.

Also shown in FIG. 4 is filter depth (FD1). FD1 represents the maximum depth of filter cell 400 as measured in the direction of an air flow through filter cell 400. As shown, the FD1 of filter cell 400 corresponds substantially with the depth of right frame side 410a and left frame side 410b.

FIG. 5 is a horizontal cross section view AA of improved electrostatic precipitation air cleaner 100 shown in FIG. 1. As shown, intake air 500 is drawn into housing 110 through air intake 120 by air mover 340 and subsequently passes through ionization field 550, intermediate element 440, collector plates 431, air mover 340 and exits housing 110 through air exit 122 as clean air 502. As shown, collector plates 431 are not uni-planar having non parallel surfaces relative to each other, and include structural bends 435 which facilitate the flatness and structural integrity. Also shown are projections 520 corresponding with right frame side 410a and left frame side 410b of filter cell 400. Projections 520 interface with corresponding walls 510 of housing 110 to assure that filter cell 400 is installed correctly in the device.

Ionization field 550 is generated between ion emitter electrode 420 and right frame side 410a, left frame side 410b, and intermediate element 440 by inducing a biased voltage potential between ion emitter electrode 420 and right frame side 410a, left frame side 410b, and intermediate element 440. In a preferred embodiment, ion emitter electrode 420 is charged with a positive voltage and right frame side 410a, left frame side 410b, and intermediate element 440 are negatively charged or connected to ground.

Also shown are dimensions C1, PD1, PS1, HD1, and FD1. C1 is the clearance distance as measured in the direction of an air flow through filter cell 400 which is desired for efficient air flow from filter cell 400 to air mover 340. PD1 is the depth as measured in the direction of an air flow through filter cell 400 of collector plates 431 to provide sufficient filtration of intake air 500. PS1 is the dimension of the space between each of collector plates 431. HD1 is the overall depth of housing 110 as measured in the direction of an air flow through filter cell 400.

Figure 6:
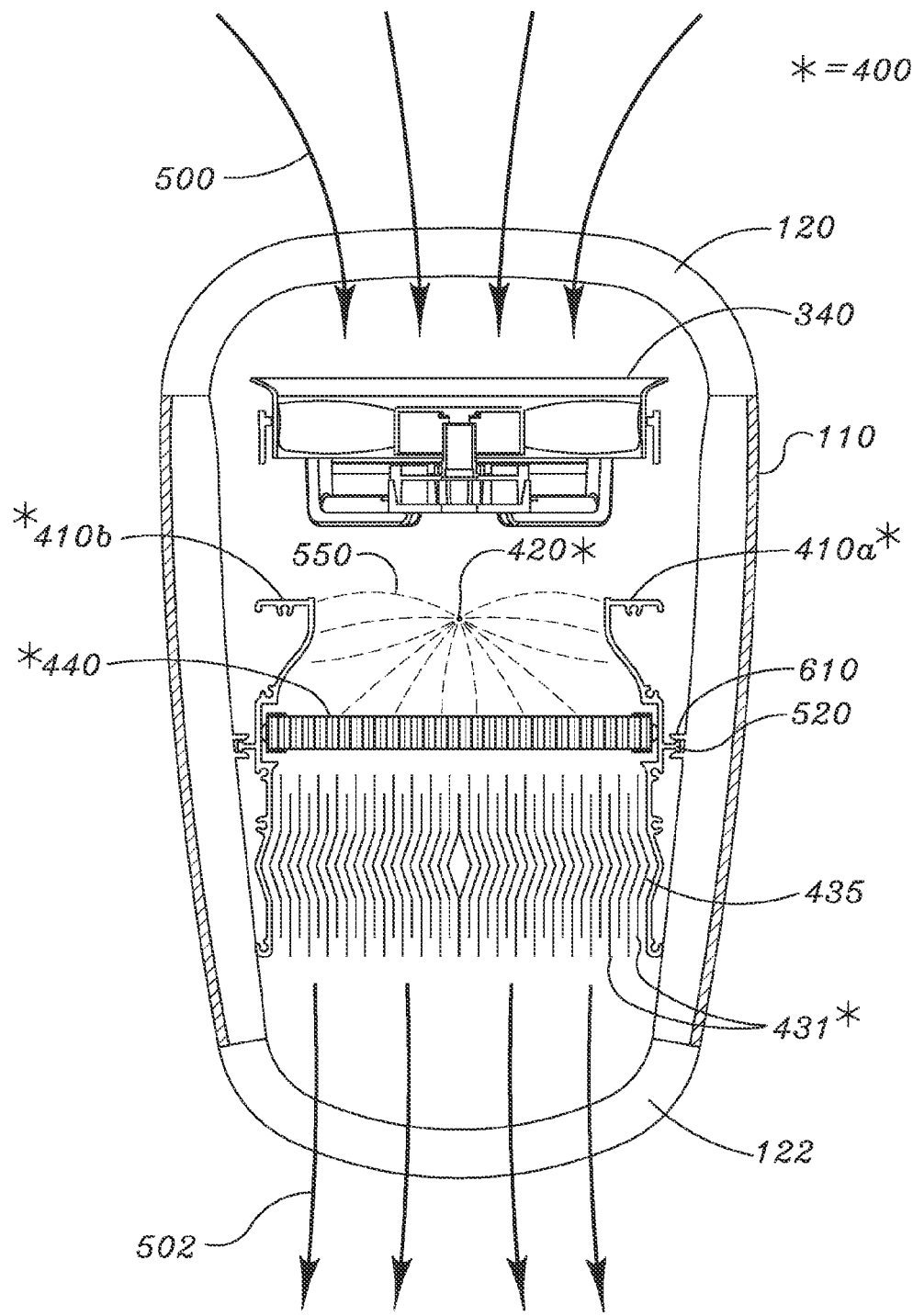
FIG. 6 is an alternate horizontal cross section view AA of FIG. 1.

FIG. 6 is an alternate horizontal cross section view AA of improved electrostatic precipitation air cleaner 100 shown in FIG. 1. As shown, intake air 500 is drawn into housing 110 through air intake 120 by air mover 340 and subsequently passes through air mover 340, ionization field 550, intermediate element 440, collector plates 431 (that include structural bends 435), and exits housing 110 through air exit 122 as clean air 502. Also shown are projections 520 corresponding with right frame side 410a and left frame side 410b of filter cell 400. Projections 520 interface with corresponding walls 610 of housing 110 to assure that filter cell 400 is installed correctly in the device. In all other aspects, alternate horizontal cross section view AA of FIG. 6 is similar to horizontal cross section view AA of FIG. 5.

Figure 7:
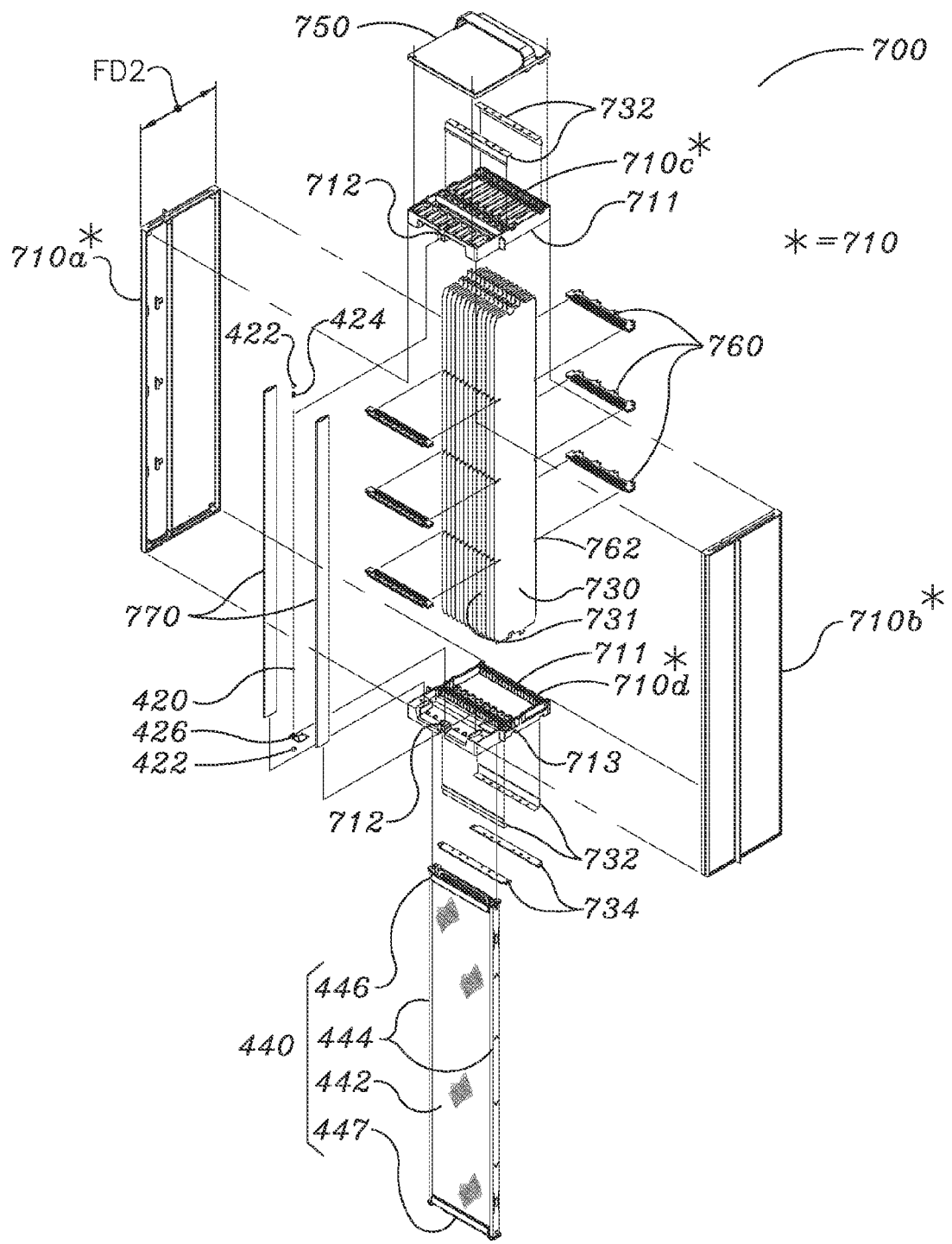
FIG. 7 is a rear exploded perspective view of another embodiment of a multi-stage electrostatic precipitation filter cell.

FIG. 7 is a rear exploded perspective view of another embodiment of a multi-stage electrostatic precipitation filter cell 700. Filter cell 700 includes filter frame 710 which includes right frame side 710a, left frame side 710b, frame top 710c, frame bottom 710d. As shown, when assembled ion emitter electrode 420, intermediate element 440, and collector electrode 730 are located within filter frame 710.

In the embodiment shown in FIG. 7, ion emitter electrode 420 is a wire extending between frame top 710c and frame bottom 710d. Also shown are electrically biased strippers 770 located on either side of ion emitter electrode 420 and extending between frame top 710c and frame bottom 710d. Ion emitter electrode 420 is attached through slot/socket 712 located in top and bottom frames 710c and 710d and retained in slot/socket 712 via anchor 422 crimped onto each distal end of ion emitter electrode 420. Spring 424 is used to maintain a straightness of ion emitter electrode 420 when assembled between top and bottom frames 710c and 710d by exerting light tension. Wire contact 426 contacts anchor 422 and ion emitter electrode 420 and makes electrical contact when filter cell 700 is installed in improved electrostatic precipitation air cleaner 100. As described, ion emitter electrode 420 can easily be replaced in filter cell 700 in case of damage.

Collector electrode 730 is comprised of a plurality of collector plates 731 that extend between top and bottom frames 710c and 710d. As shown, collector plates 731 are uni-planar. As shown, each of collector plates 731 may include spacer slots 762 to facilitate the installation of spacers 760. Spacers 760 are used to maintain the desired space between each of collector plates 731, especially as the vertical length of filter cell 700 increases.

Each of collector plates 731 fit into plate slots 711 of top and bottom frames 710c and 710d. Collector plates 731, L-contacts 732, and plate contacts 734 are designed to electrically connect the collector electrode 730 when filter cell 700 is assembled and installed in improved electrostatic precipitation air cleaner 100.

Intermediate element 440 is comprised of air permeable mesh 442, sides 444, top 446, and bottom 447. Air permeable mesh 442 may be composed of a non-conductive material, such, as for example, polymer, paper, glass fibers, and the like. It is also contemplated that air permeable mesh 442 may be composed of an electrical conductive material, such as, for example, steel, aluminum, copper or other metals or metal alloys. Additionally, air permeable mesh may be coated with carbon, manganese oxide, charcoal, titanium dioxide, and/or other materials for the purpose of facilitating odor and chemical removal from an air stream passing through air permeable mesh 442.

Intermediate element 440 is assembled into filter cell 700 through element slots 713 located in top and bottom frames 710c and 710d. As shown, intermediate element 440 can be removed from filter cell 700 through element slot 713 located in bottom frame 710d. When assembled, cell top 750 covers element slot 713 located in top frame 710c and, as such, prevents the removal of intermediate element 440 through top frame 710c. The ability to remove intermediate element 440 from filter cell 700 allows the user to periodically clean and or replace intermediate element 440 absent the need of disassembling filter cell 700.

Also shown in FIG. 7 is filter depth (FD2). FD2 represents the maximum depth of filter cell 700 as measured in the direction of an air flow through filter cell 700. As shown, the FD2 of filter cell 700 corresponds substantially with the depth of right frame side 710a and left frame side 710b.

Figure 8:
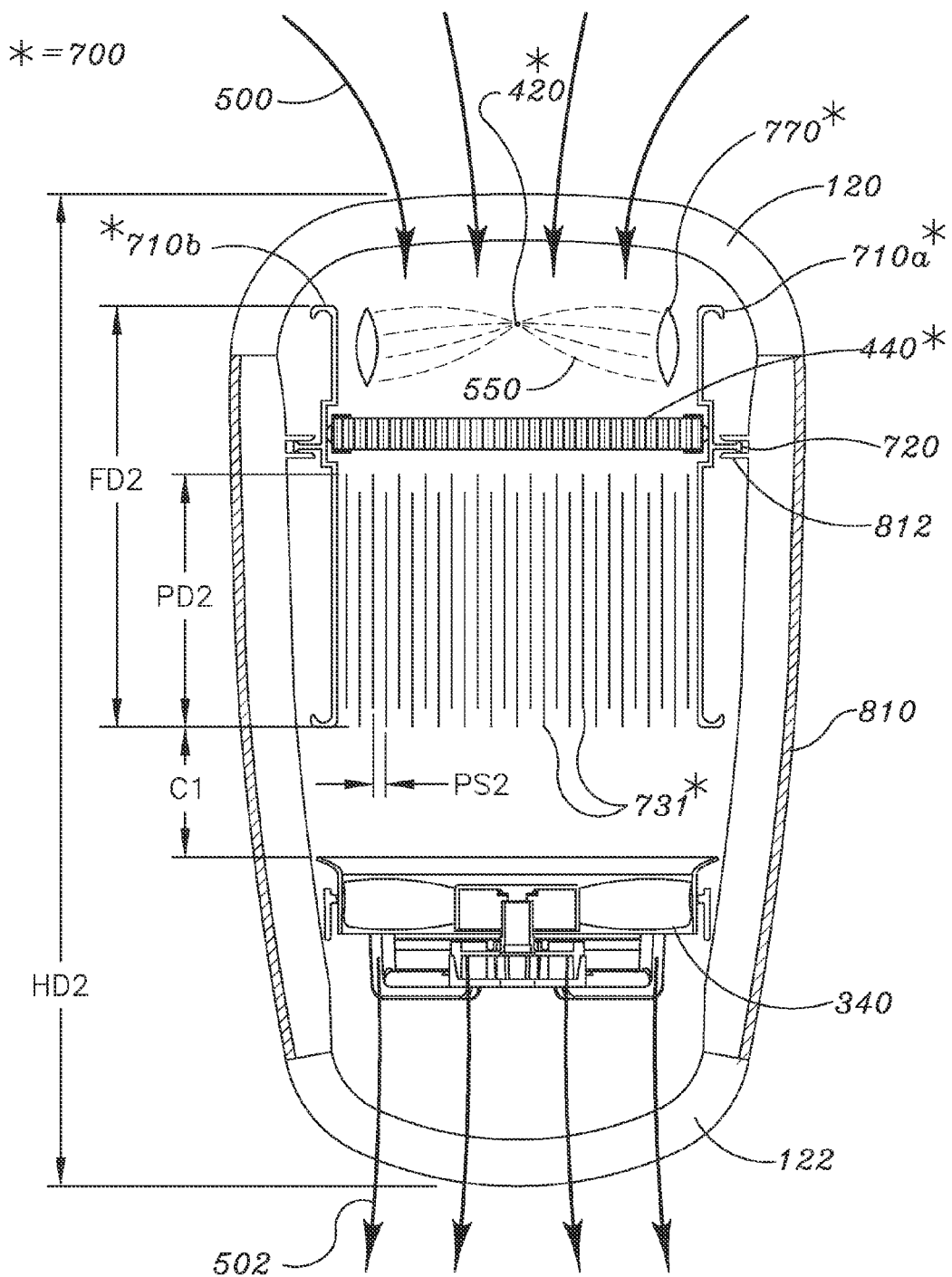
FIG. 8 is another alternate horizontal cross section view AA of FIG. 1.

FIG. 8 is an alternate horizontal cross section view AA of improved electrostatic precipitation air cleaner 100 shown in FIG. 1 including filter cell 700. As shown, intake air 500 is drawn into housing 810 through air intake 120 by air mover 340 and subsequently passes through ionization field 550, intermediate element 440, collector plates 731, air mover 340 and exits housing 810 through air exit 122 as clean air 502. As shown, collector plates 731 are uni-planar and do not include structural bends 435 as shown in FIGS. 4, 5 and 6. Also shown are projections 720 corresponding with right frame side 710a and left frame side 710b of filter cell 700. Projections 720 interface with corresponding walls 812 of housing 810 to assure that filter cell 700 is installed correctly in the device.

Ionization field 550 is generated between ion emitter electrode 420 and electrically biased strippers 770 located on either side of ion emitter electrode 420 by inducing a biased voltage potential between ion emitter electrode 420 and electrically biased strippers 770. In this embodiment, intermediate element 440 is not electrically biased relative to ion emitter electrode 420. In the preferred embodiment, ion emitter electrode 420 is charged with a positive voltage and electrically biased strippers 770 are negatively charged or connected to ground.

Also shown are dimensions C1, PD2, PS2, HD2, and FD2. C1 is the clearance distance as measured in the direction of an air flow through filter cell 700 which is desired for efficient air flow from filter cell 700 to air mover 340. PD2 is the depth as measured in the direction of an air flow through filter cell 700 of collector plates 731 to provide sufficient filtration of intake air 500. PS2 is the dimension of the space between each of collector plates 731. HD2 is the overall depth of housing 810 as measured in the direction of an air flow through filter cell 700.

Although FIGS. 5 and 8 are similar there are some distinctions that exist. A first distinction is that right frame side 410a and left frame side 410b of FIG. 5 are electrically conductive and/or are coated with an electrically conductive material while right frame side 710a and left frame side 710b of FIG. 8 are not electrically conductive. Right frame side 410a and left frame side 410b of FIG. 5 are electrically biased with reference to ion emitter electrode 420 and are utilized to produce ionization field 550. The embodiment of FIG. 8 requires the use of electrically biased strippers 770 to produce ionization field 550 associated with FIG. 8. The additional components shown in FIG. 8 may increase the cost and complication of the assembly.

Another distinction is intermediate element 440 of FIG. 5 is electrically biased with reference to ion emitter electrode 420 and is utilized to enhance the production of ionization field 550. As shown, the electrical biased characteristic of intermediate element 440 of FIG. 5 is achieved through contact with right frame side 410a and left frame side 410b. Intermediate element 440 of FIG. 8 is not electrically biased with reference to ion emitter electrode 420 and does not serve to enhance the production of ionization field 550. It should be noted, however, that intermediate element 440 in both the embodiment of FIG. 5 and the embodiment of FIG. 8 are used to mitigate the passage of large particles from entering collector plates 431 and 731 respectively.

Yet another distinction is collector plates 431 of FIG. 5 are not uni-planar having non parallel surfaces relative to each other, and include structural bends 435, whereas collector plates 731 of FIG. 8 are uni-planar and do not include structural bends. As mentioned, structural bends 435 facilitate the flatness and structural integrity of collector plates 431. The increased flatness and structural strength in turn allows the space between each of collector plates 431, shown as PS1, to be minimized when compared to the space between each of collector plates 731, shown as PS2. Minimization of PS1 can therefore be accomplished without increasing unwanted electrical arcing between collector plates 431 that may occur due to being bent or miss-shaped or damaged associated with collector plates 731, which are uni-planar. The minimized PS1 provides the ability to have more collector plates 431 between right frame side 410a and left frame side 410b as compared to the number of collector plates 731 between right frame side 710a and left frame side 710b and allows the embodiment of FIG. 5 to have the same amount of collector surface area with a minimized plate depth PD1 when compared to PD2 of FIG. 8. The minimization of PD1 contributes to the minimization of filter depth FD1 and housing depth HD1 of FIG. 5 when compared to filter depth FD2 and housing depth HD2 of FIG. 8. This overall minimization increases the space saving characteristics of the embodiment of FIG. 5 when compared to the embodiment of FIG. 8.

Figure 9:
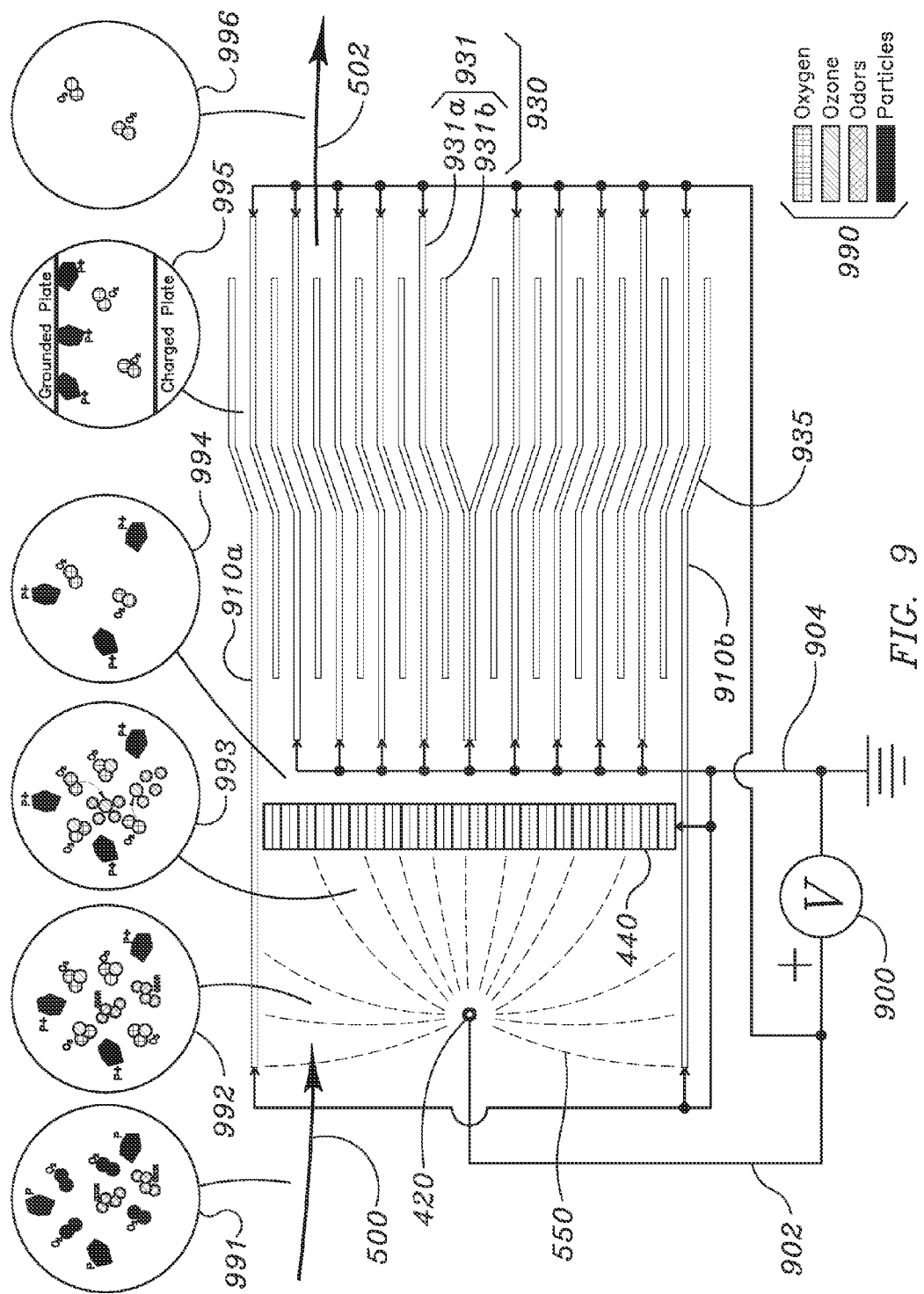
FIG. 9 is a schematic illustration of the electrical and performance characteristics of an embodiment of an improved electrostatic precipitation air cleaner.

FIG. 9 is a schematic illustration of electrical and performance characteristics of improved electrostatic precipitation air cleaner 100. As shown, voltage source 900 supplies a positive voltage to ion emitter electrode 420, and positive charged plates 931a. The negative or ground is connected to right frame side 910a, left frame side 910b, intermediate element 440 and grounded plates 931b. Positive circuit 902 and grounded circuit 904 may be comprised of wires, contact plates, contact springs, and the like without deviating from the spirit of the invention. As can be seen, collector electrode 930 is comprised of collector plates 931.

Also shown are six stages of the air purification process 991, 992, 993, 994, 995, and 996. Also shown is key 990 as an aid to distinguish the various elements found in the illustrated six stages. Intake air 500 enters the device in stage one 991 and contains oxygen molecules, odors molecules and other particles. Intake air passes through ionization field 550 in stage two 992, wherein some of the oxygen molecules are converted to ozone molecules ($O_3$) and the particles within the intake air 500 are charged with a positive charge. Stage three 993 occurs between ion emitter electrode 420 and intermediate element 440, wherein the unstable ozone molecules degrade and destroy the odor molecules. Intermediate element 440 in the present embodiment is constructed of and/or coated with a catalytic ozone conversion material or an ozone absorption material such as manganese oxide. Stage four 994 is subsequent intermediate element 440 wherein a substantial portion of the ozone molecules have been removed by the ozone absorption material of intermediate element 440. Stage five 995 is located between electrically biased collector plates 931 and electrically biased right frame side 910a, and left frame side 910b. The particles that were positively charged by ionization field 550 are repelled by positive charged plates 931a and electrostatically adhere to grounded plates 931b, right frame side 910a, and left frame side 910b. Stage six 996 illustrates clean air 502 exiting electrostatic precipitation air cleaner 100 wherein a substantial portion of the odor molecules, ozone and other particles have been removed.

As shown, collector plates 931 right frame side 910a and left frame side 910b include structural bends 935. In conjunction with added structural strength and flatness of collector plates 931, structural bends 935 also serve to re-direct a flow of air as it passes through stage five 995 of the air purification process. The re-direction of the air flow causes the air to impinge the surface of negative collector plates 931b and enhances the efficiency of the particle collection of stage five 995 when compared to the uni-planar collector plates 731 of FIG. 8.

It has been found that locating negative collector plates 931b ahead of positive charged plates 931a relative to the flow of air through collector electrode 930 serves to promote particle collection efficiency. The positively charged particles in the airflow are attracted to negative collector plates 931b as they enter collector electrode 930 which promotes the particle entry into the multiple spaces between negative collector plates 931b and positive charged plates 931a.

It has been found that the location of intermediate element 440 as described subsequent to ion emitter electrode 420 and prior to collector electrodes 430, 730 and 930, as shown, has several distinct advantages. The first advantage is the location of intermediate element 440 prior to collector electrodes 430, 730, and 930 acts as a particulate per-filter and prevents large debris from entering collector electrodes 430, 730, and 930, thereby mitigating possible electrical arcing and shorts between the biased collector plates 431, 731 and 931.

Another advantage of locating intermediate element 430 as described subsequent to ion emitter electrode 420 is the possibility of inducing the opposite electrical charge in intermediate element 430 relative to ion emitter electrode 420. The efficiency of ion production within ionization field 550 is enhanced and the voltage supplied to the ion emitter electrode 420 can be reduced. In one embodiment, the amount of ozone produced by improved electrostatic precipitation air cleaner 100 utilizing an opposite charge intermediate element 440 relative to ion emitter electrode 420 was sufficiently low to pass industrial and environmental regulations absent ozone absorption materials and coatings.

As can be seen, the improved electrostatic precipitation air cleaner shown and described in the present invention overcomes many deficiencies of conventional electrostatic precipitation air cleaners. The improved electrostatic precipitation air cleaners reduces and/or eliminate ozone which results from the electrostatic precipitation process and mitigates the arcing problem associated with the biased collector plates. The improved electrostatic precipitation air cleaners also reduces materials and manufacturing costs while providing a clean air delivery rate sufficient to clean an ordinary sized room.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed:

1. An electrostatic precipitation room air cleaner, comprising:
    a housing having an air inlet and an air outlet;
    an air mover located in said housing for moving a stream of air along an airflow path between said air inlet and said air outlet;
    an ion emitter electrode located in said housing positioned in said airflow path downstream of said air inlet for ionizing particulates entrained in said stream of air, said ion emitter charged with a first polarity;
    a collector electrode located in said housing having an inlet downstream of said ion emitter electrode, said collector electrode comprising:
        a plurality of collector plates spaced apart in a direction across said airflow path, an electrical bias generated by charging at least one collector plate of said plurality of collector plates with said first polarity and charging at least another collector plate of said plurality of collector plates with a second polarity, said second polarity being an opposing polarity from said first polarity, as to create and maintain an electric field in a space between said plates;
    an air permeable intermediate element substantially coextensive with a cross-section of said airflow path and located in said housing intermediate said ion emitter electrode and said collector electrode and not physically contacting said ion emitter electrode and said plurality of collector plates, said intermediate element comprising a conductive grid charged with said second polarity and electrically biased to attract ions from said ion emitter electrode; and
    wherein particulates entrained in said stream of air are ionized and said collector electrode acts to precipitate said ionized particulates from said stream of air onto confronting surfaces of said collector plates.

2. The electrostatic precipitation room air cleaner of claim 1, wherein said intermediate element and said collector electrode are a unitary assembly configured to be removed as a single unit from said electrostatic precipitation room air cleaner.

3. The electrostatic precipitation room air cleaner of claim 2, wherein said intermediate element is configured to be removed from said unitary assembly.

4. The electrostatic precipitation room air cleaner of claim 2, wherein said unitary assembly further comprises electrically conductive frame sides extending between said collector electrode and said intermediate element, said frame sides charged with said second polarity to establish an electrical connection between said intermediate element and a source of said second polarity.

5. The electrostatic precipitation room air cleaner of claim 4, wherein said conductive grid cooperates with said ion emitter electrode to create and impart force components acting both transversely to and longitudinally of a direction of said airflow with a result that more ions, and therewith more ionized particulates enter said inlet of said collector electrode.

6. The electrostatic precipitation room air cleaner of claim 4, wherein said frame sides extend beyond said intermediate element toward said ion emitter electrode, wherein said frame sides are spaced apart from said ion emitter electrode in a direction across said air flow path, and wherein said frame sides attract ions from said ion emitter electrode.

7. The electrostatic precipitation room air cleaner of claim 6, wherein said ion emitter electrode is included in said unitary assembly and is configured to be removed from said electrostatic precipitation room air cleaner with said intermediate element and said collector electrode.

8. The electrostatic precipitation room air cleaner of claim 1, wherein said intermediate element includes an ozone remediation coating on said air permeable, conductive grid.

9. The electrostatic precipitation room air cleaner of claim 1, wherein said air mover is at least one air mover located along said airflow path intermediate said air inlet and said ion emitter electrode.

10. The electrostatic precipitation room air cleaner of claim 1, wherein said air mover is at least one air mover located along said airflow path intermediate said collector electrode and said air outlet.

11. The electrostatic precipitation room air cleaner of claim 1, further comprising at least two electrically biased strippers charged with said second polarity with said ion emitter electrode located intermediate said electrically biased strippers, wherein said electrically biased strippers cooperate with said ion emitter electrode to create and impart a force component acting both transversely to and longitudinally of a direction of said airflow with the result that more ions, and therewith more ionized particulates enter said inlet of said collector electrode.

12. An electrostatic filter system comprising:
    an ion emitter electrode charged with a first polarity and positioned in an air stream for ionizing particulates entrained in said air stream;
    an air permeable intermediate element grid located downstream from said ion emitter and substantially coextensive with a cross-section of an air flow path of said air stream, said intermediate element grid comprising an electrically conductive grid charged with a second polarity, said second polarity being an opposing polarity from said first polarity;

a collector electrode located downstream from said intermediate element grid, said collector electrode comprising;
an inlet;
an outlet located downstream from said inlet; and
a plurality of collector plates located between said inlet and said outlet spaced apart in a direction across a flow direction of said airstream, an electrical bias generated by charging at least one collector plate of said plurality of collector plates with said first polarity and charging at least another collector plate of said plurality of collector plates with said second polarity to create and maintain an electric field in a space between said plates which acts to precipitate ionized particulates entrained in said air stream onto a confronting surfaces of said collector plates;
wherein said air permeable intermediate element grid does not physically contact said ion emitter electrode and said plurality of collector plates.

13. The electrostatic filter system of claim 12, wherein said intermediate element includes an ozone remediation coating on said grid.

14. The electrostatic filter system of claim 13, wherein said grid of said intermediate element cooperates with said ion emitter electrode to create and impart a force component acting both transversely to and longitudinally of the direction of said airflow with the result that more ions, and therewith more ionized particulates enter said inlet of said collector electrode.

15. The electrostatic filter system of claim 12, wherein said ion emitter electrode comprises a single wire.

16. The electrostatic filter system of claim 12, wherein said ion emitter electrode, said intermediate element, and said collector electrode are a unitary assembly capable of being removed as a single unit from an electrostatic precipitation room air cleaner.

17. The electrostatic filter system of claim 16, wherein said unitary assembly further comprises electrically conductive frame sides extending between said ion emitter electrode and said collector electrode, wherein said frame sides are charged with said second polarity and establish an electrical connection between said intermediate element and a source of said second polarity.

18. The electrostatic filter system of claim 17, wherein said intermediate element is configured to be removed from said unitary assembly.

19. The electrostatic filter system of claim 17, wherein said frame sides are spaced apart from said ion emitter electrode in a direction transverse to said flow direction of said airstream, and wherein said side frames attract ions from said ion emitter electrode.

20. The electrostatic filter system of claim 12, further comprising at least two electrically biased strippers charged with said second polarity with said ion emitter electrode located intermediate said electrically biased strippers, wherein said electrically biased strippers cooperate with said ion emitter electrode to create and impart a force components acting both transversely to and longitudinally of the direction of said airflow with the result that more ions, and therewith more ionized particulates enter said inlet of said collector electrode.

21. The electrostatic filter system of claim 20, wherein said ion emitter electrode, said biased stripper, said intermediate element, and said collector electrode are a unitary assembly capable of being removed from an electrostatic precipitation room air cleaner as a single unit.

22. The electrostatic filter system of claim 21, wherein said intermediate element is capable of being removed from said unitary assembly.

* * * * *